Nov. 29, 1955 T. A. HARRIS 2,725,040
CONTROL MEANS FOR SERVO-MECHANISM OF THE KIND HAVING
OUTPUT MEANS OPERABLE BY LIQUID PRESSURE
AND A CONTROL MEMBER THEREFOR
Filed April 24, 1952
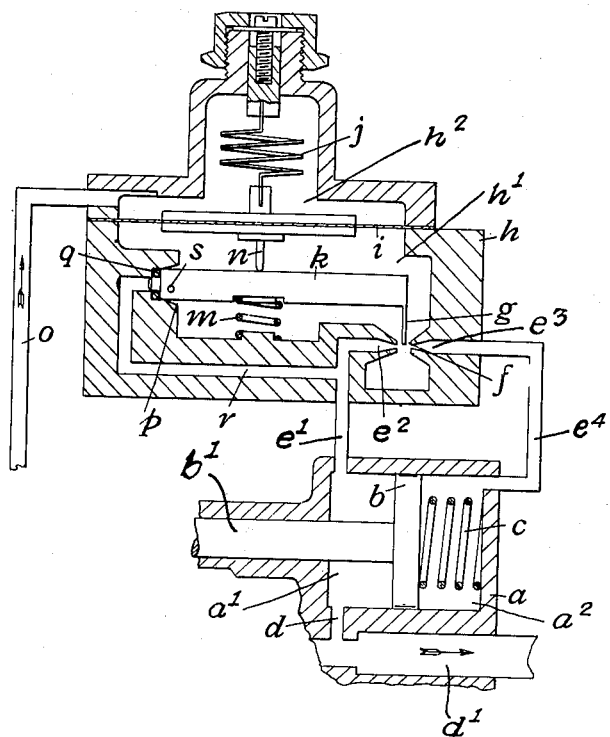
Inventor
T. A. Harris
By Glascock Downing Seebold
Attys.

United States Patent Office 2,725,040
Patented Nov. 29, 1955

2,725,040

CONTROL MEANS FOR SERVO-MECHANISM OF THE KIND HAVING OUTPUT MEANS OPERABLE BY LIQUID PRESSURE AND A CONTROL MEMBER THEREFOR

Thomas Alfred Harris, Edgbaston, Birmingham, England, assignor to Joseph Lucas (Industries) Limited, Birmingham, England, a British company Application April 24, 1952, Serial No. 284,188

Claims priority, application Great Britain April 25, 1951

1 Claim. (Cl. 121—38)

This invention relates to systems for supplying liquid fuel to the combustion chambers of jet engines, gas turbines or other prime movers, the systems being of the kind comprising a liquid-operated servo mechanism for controlling the rate of supply of fuel, and a means responsive to the speed of the prime mover for controlling the servo mechanism, the latter being adapted to actuate a means for varying the output of a fuel pump, or a throttle or by-pass valve or other fuel regulating means in the system, in order to vary the fuel supply to the prime mover.

Systems of the above kind suffer from the disadvantage that the speed-responsive means tend to hunt when changes occur in the liquid pressure acting thereon, and the object of the present invention is to minimise this tendency in a simple and effective manner.

The invention comprises in combination a diaphragm or piston responsive to liquid pressure, and exposible at one side to a variable liquid pressure, and a spring loaded lever acting on the opposite side of the diaphragm or piston, and exposible to a second variable liquid pressure at a position on the lever where the last mentioned liquid pressure can oppose the spring loading of the lever so that the force exerted by the lever on the diaphragm or piston is inversely proportional to the second liquid pressure.

The drawing is a diagrammatic sectional side view of a servo mechanism and controlling means therefor constructed in accordance with the invention.

The servo mechanism shown in the drawing comprises a cylinder $a$ containing a slidable piston $b$ which may be loaded by a spring $c$, and from which extends a piston rod $b^1$ adapted in known manner to actuate means for varying the output of a fuel supply pump, or actuating a throttle or by-pass valve or other fuel regulating means, to control the rate of fuel supply to a fuel discharge passage $d^1$ leading to a prime mover. For actuating the piston $b$ liquid fuel under pressure (herein termed the motive liquid) is led through a passage $d$ to one end $a^1$ of the cylinder $a$, and thence to the other end $a^2$ of the cylinder through a duct consisting of a pair of coaxial parts $e^2$, $e^3$ having a gap $f$ between their adjacent ends, the end $a^1$ of the cylinder being connected to the duct part $e^2$ by a passage $e^1$, and the other end $a^2$ of the cylinder being connected to the duct part $e^3$ by a passage $e^4$. For varying the liquid flow across the gap $f$ between the duct parts $e^2$, $e^3$, there is provided a baffle means $g$ which is movable across the gap in response to the action of controlling means hereinafter described. When the gap $f$ is unobstructed by the baffle means $g$, the motive liquid admitted to the end $a^1$ of the cylinder has free access to the other end $a^2$ through the passage $e^1$, duct parts $e^2$, $e^3$, and passage $e^4$. In this condition the piston $b$ is exposed on opposite sides to equal liquid pressures, and is moved to the left partly by the action of the spring $c$ (when the latter is employed) and partly by the liquid pressure acting on the right hand side of the piston, this side of the piston having a greater area exposed to liquid pressure than the left hand side due to the piston rod $b^1$ which extends from the last mentioned side of the piston. But when the gap $f$ is obstructed by the baffle means $g$, the piston $b$ is moved to the right by the predominating liquid pressure acting on the left hand side of the piston, the liquid in the cylinder part $a^2$ at the other side of the piston being permitted to escape from the duct part $e^3$ into a hollow body part $h$ which is provided with an outlet (not shown). It will be understood that any convenient provision is made for limiting the movement of the piston $b$ so that the passages $d$, $e^1$ cannot be closed by the piston.

The controlling means above mentioned is formed in part by the hollow body part $h$ which is divided into two compartments $h^1$, $h^2$ by a flexible diaphragm $i$ (which latter term will hereafter be used as including a piston slidable in a cylindrical chamber), the diaphragm being loaded by a spring $j$. In the compartment $h^1$ are arranged the duct parts $e^2$, $e^5$ which are respectively connected by the passages $e^1$, $e^4$ to the ends $a^1$, $a^2$ of the servo-mechanism cylinder $a$, the motive liquid inlet passage $d$ being in communication with the fuel discharge passage $d^1$.

In the same compartment $h^1$ as the duct parts $e^2$, $e^3$ is arranged a lever $k$ on one end of which is formed or secured the baffle means $g$. The lever is loaded by a spring $m$ and is adapted through a stem $n$ to exert on the underside of the diaphragm $i$, under the action of its spring, a force opposed to the pressure of a liquid conveyed by the passage $o$ and acting on the upper side of the diaphragm, this pressure being related to the speed of the prime mover.

At least one end of the lever $k$, the left hand end in the drawing, is of cylindrical form and is supported in a cylindrical socket $p$ in the body part $h$ against a resilient sealing ring $q$, the base of the socket being in communication by way of a passage $r$ with the duct part $e^2$. Also the socket is shaped to permit pivotal movement of the lever. The lever is carried by a pivot pin $s$ which is located below the longitudinal central axis of the socket, so that the lever can be rocked against the action of the spring by the pressure of the liquid acting on its end. In effect the lever is equivalent to a bell-crank lever of which the end face subject to liquid pressure is the short arm, and the part acted on by the spring is the long arm.

When the controlling means above described is in action, the lever $k$ exerts on the underside of the diaphragm $i$ a force inversely proportional to the liquid pressure acting on the lever, and this force serves by opposing the liquid pressure acting on the upper side of the diaphragm to minimise hunting of the controlling means when changes occur in the liquid pressure acting on the diaphragm. This is due to the fact that as the pressure of the liquid flowing through the passage $d^1$, and thus acting on the lever $k$, is reduced as a result of downward movement of the diaphragm $i$, the resistance to further downward movement of the diaphragm, for effecting further reduction of the liquid flowing through the passage $d^1$, is increased.

Having thus described my invention what I claim as new and desire to secure by Letters Patent is:

Control means for a servo mechanism of the kind having output means operable by liquid pressure and a control member therefor, comprising in combination with the control member, a liquid pressure-responsive member, passage means for exposing one side of said liquid pressure-responsive member to a variable liquid control pressure, a spring-loaded lever pivoted near one end and movable by said liquid pressure-responsive member for varying the position of said control member, said spring-loaded lever being arranged to act at a position between its ends on the opposite side of said liquid pressure-responsive member for opposing movement thereof by said control pressure, and additional passage means for exposing the end of said lever adjacent its pivot axis to the liquid pressure effective in the servo mechanism, the said pivot axis being located so that the liquid pressure to which said lever is exposed tends to move said lever in opposition to its spring loading, and thereby enables said lever to exert on said liquid pressure-responsive member a force inversely proportional to the liquid pressure acting on said lever.

References Cited in the file of this patent

UNITED STATES PATENTS

| | | |
|---|---|---|
| 2,098,914 | Gorrie | Nov. 9, 1937 |
| 2,397,448 | Todd | Mar. 26, 1946 |
| 2,619,104 | Temple | Nov. 25, 1952 |
| 2,621,632 | Ifield | Dec. 16, 1952 |
| 2,651,317 | Heinz | Sept. 8, 1953 |